United States Patent
Qu et al.

(10) Patent No.: US 11,089,548 B2
(45) Date of Patent: Aug. 10, 2021

(54) METHOD AND DEVICE FOR LOW POWER SYNCHRONIZATION IN WIRELESS COMMUNICATION

(71) Applicant: MediaTek Singapore Pte. Ltd., Singapore (SG)

(72) Inventors: Wenze Qu, Beijing (CN); Po-Ying Chen, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/483,241

(22) PCT Filed: Feb. 5, 2018

(86) PCT No.: PCT/CN2018/075235
§ 371 (c)(1),
(2) Date: Aug. 2, 2019

(87) PCT Pub. No.: WO2019/148486
PCT Pub. Date: Aug. 8, 2019

(65) Prior Publication Data
US 2020/0367163 A1    Nov. 19, 2020

(51) Int. Cl.
*H04W 52/02* (2009.01)
*H04B 17/336* (2015.01)
(Continued)

(52) U.S. Cl.
CPC ...... *H04W 52/0229* (2013.01); *H04B 17/336* (2015.01); *H04W 4/80* (2018.02);
(Continued)

(58) Field of Classification Search
CPC .............. H04W 52/0229; H04W 4/80; H04W 52/0216; H04W 52/028; H04W 56/001;
(Continued)

(56) References Cited

U.S. PATENT DOCUMENTS

| 5,856,786 A | 1/1999 | DiFrancisco et al. |
| 8,565,169 B2 | 10/2013 | Tavildar et al. |

(Continued)

FOREIGN PATENT DOCUMENTS

| CN | 102714852 A | 10/2012 |
| CN | 105636183 A | 6/2016 |
| EP | 0 863 636 A2 | 9/1998 |

OTHER PUBLICATIONS

International Search Report and Written Opinion dated Oct. 15, 2018 in PCT/CN2018/075235 filed Feb. 5, 2018.
(Continued)

*Primary Examiner* — Diane D Mizrahi
(74) *Attorney, Agent, or Firm* — Oblon, McClelland, Maier & Neustadt, L.L.P.

(57) ABSTRACT

Aspects of the disclosure provide methods and device for low power synchronization in wireless communication. The method waking an electronic device that communicates with a network from a low power mode to a working mode. The method may include transitioning from the low power mode to a pre-sync mode that includes a first phase having a first phase duration and a sleep phase having a sleep phase duration. A quality of synchronization signals transmitted on a first network carrier of the network during the first phase of the pre-sync mode can be detected, and the sleep phase duration of the sleep phase can be set based on at least the detected quality of the synchronization signals. During the pre-sync mode, the operation mode can transition from the first phase to the sleep phase when the sleep phase duration is greater than a sleep threshold.

17 Claims, 4 Drawing Sheets

(51) Int. Cl.
  *H04W 4/80* (2018.01)
  *H04W 56/00* (2009.01)
(52) U.S. Cl.
  CPC ..... *H04W 52/028* (2013.01); *H04W 52/0216* (2013.01); *H04W 56/001* (2013.01)
(58) Field of Classification Search
  CPC .. H04W 52/0245; H04B 17/336; Y02D 30/70
  See application file for complete search history.

(56) References Cited

U.S. PATENT DOCUMENTS

| | | | |
|---|---|---|---|
| 8,923,226 | B2 | 12/2014 | Tavildar et al. |
| 9,699,828 | B2 | 7/2017 | Das et al. |
| 2009/0286532 | A1 | 11/2009 | Nigam et al. |
| 2014/0301263 | A1 | 10/2014 | Ji et al. |
| 2016/0227602 | A1 | 8/2016 | Yi et al. |
| 2017/0331670 | A1* | 11/2017 | Parkvall .............. H04W 52/028 |

OTHER PUBLICATIONS

Taiwanese Office Action and Search Report dated Nov. 11, 2019, in Patent Application No. 108103206, 13 pages (with English Translation of Category of Cited Documents).
Ericsson, "Non-anchor carrier Paging in NB-IoT", 3GPP TSG-RAN WG2 #97, Tdoc R2-1700768, Feb. 13-17, 2017, 6 pages.

* cited by examiner

METHOD AND DEVICE FOR LOW POWER SYNCHRONIZATION IN WIRELESS COMMUNICATION

TECHNICAL FIELD

The disclosed embodiments relate generally to physical downlink control channel (PDCCH) monitoring for low power consumption in wireless communication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Narrowband Internet of Things (NB-IoT) is a Low Power Wide Area Network (LPWAN) radio technology standard developed to enable a wide range of devices and services to be connected using cellular telecommunications bands. NB-IoT is a narrowband radio technology designed for the Internet of Things, and is one of a range of Mobile IoT (MIoT) technologies standardized by the 3GPP. The physical downlink control channel for NB-IoT needs to be monitored.

Machine type communication (MTC) devices, such as wireless sensors, and the like may keep track of real-time information, such as temperature, rainfall, and the like. Power consumption is one of the dominant concerns for an electronic device, such as a MTC device, thus reducing power consumption is important.

SUMMARY

Aspects of the disclosure provide a method for waking an electronic device that communicates with a service provider network from a low power mode to a working mode. The method can include transitioning from the low power mode to a pre-synchronization (pre-sync) mode, where the pre-sync mode includes a first phase having a first phase duration and a sleep phase having a sleep phase duration. The method can also include detecting a quality of synchronization signals transmitted on a first network carrier of the service provider network during the first phase of the pre-sync mode, and setting the sleep phase duration of the sleep phase based on at least the detected quality of the synchronization signals. The method can further include transitioning during the pre-sync mode from the first phase to the sleep phase when the sleep phase duration is greater than a sleep threshold.

In an embodiment, detecting the quality of the synchronization signals during the first phase of the pre-sync mode can be implemented by detecting one or more quality parameters during the first phase that include at least one of a signal to noise ratio (SNR) of the synchronization signals, a variation of a carrier frequency offset between a local carrier of the electronic device and the first network carrier, a variation of timing between an arrival of the synchronization signals and a starting time of a processing window of the electronic device, and mobility characteristics of the electronic device.

In an embodiment, the sleep phase duration of the sleep phase can be set based on a pre-sync duration of the pre-sync mode, the first phase duration, and a second phase duration of a second phase of the pre-sync mode. The second phase duration of the second phase can be determined based on at least the one or more quality parameters.

In an embodiment, the sleep threshold can be set based on a minimal time slot used to transmit and receive the synchronization signals.

In an example, the method can further include transitioning from the sleep phase to the second phase when the sleep phase is complete and the second phase duration is larger than zero, and the synchronization signals can be transmitted on a second network carrier in the second phase of the pre-sync mode.

In an example, the first and second network carriers can be an identical anchor carrier of a narrowband Internet of Things (NB-IoT) network. In another example, the first network carrier can be an anchor carrier of an NB-IoT network, and the second network carrier can be a non-anchor carrier of the NB-IoT network.

In an embodiment, the sleep phase can consume less power than either the first phase or the second phase of the pre-sync mode.

Aspects of the disclosure can also provide an electronic device that communicates with a service provider network for waking from a low power mode to a working mode. The electronic device can be configured to include a receiver configured to receive synchronization signals from the service provider network. The electronic device can further include a process having a mode controller and a sync engine. The mode controller can be configured to switch the electronic device from the low power mode to a pre-sync mode that includes a first phase having a first phase duration and a sleep phase having a sleep phase duration, and switch the electronic device during the pre-sync mode from the first phase to the sleep phase when the sleep phase duration is greater than a sleep threshold. The sync engine can be configured to detect a quality of the synchronization signals transmitted on a first network carrier of the service provider network during the first phase of the pre-sync mode, and set the sleep phase duration of the sleep phase based on at least the detected quality of the synchronization signals.

In an embodiment, the sync engine is configured to detect the quality of the synchronization signals during the first phase of the pre-sync mode by detecting one or more quality parameters during the first phase that include at least one of a signal to noise ratio (SNR) of the synchronization signals, a variation of a carrier frequency offset between a local carrier of the electronic device and the first network carrier, a variation of timing between an arrival of the synchronization signals and a starting time of a processing window of the electronic device, and mobility characteristics of the electronic device.

In an embodiment, the sync engine is configured to set the sleep phase duration based on a pre-sync duration of the pre-sync mode, the first phase duration, and a second phase duration of a second phase of the pre-sync mode, where the second phase duration of the second phase is determined based on the one or more quality parameters.

In an embodiment, the sync engine can be configured to set the sleep threshold based on a minimal time slot used to transmit and receive the synchronization signals.

In an embodiment, the mode controller can be further configured to switch the electronic device from the sleep phase to the second phase when the sleep phase is complete and the second phase duration is larger than zero, where the synchronization signals are transmitted on a second network carrier in the second phase of the pre-sync mode.

In an embodiment, the receiver of the electronic device can be configured to receive the synchronization signals transmitted at the first and second network carriers that are an identical anchor carrier of a NB-IoT network.

In an embodiment, the receiver of the electronic device can be configured to receive the synchronization signals transmitted at the first network carrier that is an anchor carrier of an NB-IoT network, and receive the synchronization signals transmitted at the second network carrier that is a non-anchor carrier of the NB-IoT network.

Alternative aspects of the disclosure can provide a non-transitory computer readable medium having computer readable instructions stored thereon which, when executed by a processing circuit, cause the processing circuit to perform a method of waking an electronic device that communicates with a service provider network from a low power mode to a working mode. The method can include transitioning from the low power mode to a pre-sync mode where the pre-sync mode can include a first phase having a first phase duration and a sleep phase having a sleep phase duration. The method can further include detecting a quality of synchronization signals transmitted on a first network carrier of the service provider network during the first phase of the pre-sync mode, setting the sleep phase duration of the sleep phase based on at least the detected quality of the synchronization signals, and transitioning during the pre-sync mode from the first phase to the sleep phase when the sleep phase duration is greater than a sleep threshold.

BRIEF DESCRIPTION OF DRAWINGS

Various embodiments of this disclosure that are proposed as examples will be described in detail with reference to the following figures, wherein like numerals reference like elements, and wherein.

DETAILED DESCRIPTION

Figure 1:
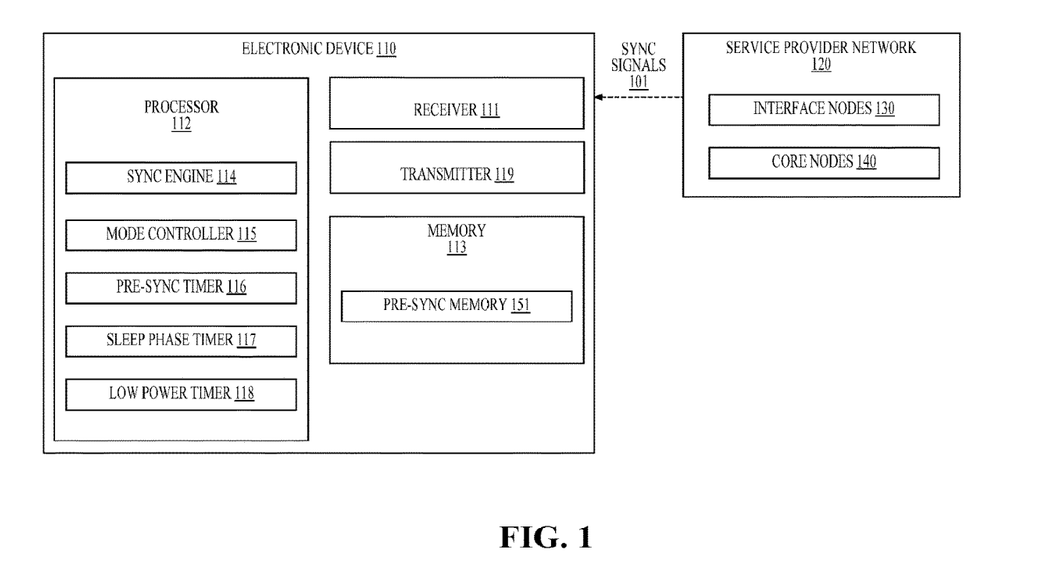
FIG. 1 shows an exemplary block diagram of a communication system according to an embodiment of the disclosure.

FIG. 1 shows an exemplary block diagram of a communication system 100 according to an embodiment of the disclosure. As shown, the communication system 100 can include an electronic device 110 configured to communicate with a service provider network 120. The electronic device 110 can further include a receiver 111, a processor 112, a memory 113, and a transmitter 119. The electronic device 110 can periodically cycle through a plurality of operation modes, including a low power mode, a pre-synchronization (pre-sync) mode, a working mode, and the like that have different levels of power consumption. In an embodiment, the low power mode consumes the least power among the operation modes. The pre-sync mode can be used to determine synchronization parameters between the electronic device 110 and the service provider network 120 when the electronic device 110 wakes from the low power mode to the working mode. According to the disclosure, the electronic device 110 is configured to implement a sleep phase during a portion of the pre-sync mode in order to save power.

The service provider network 120 can be any suitable network capable of communicating with the electronic device 110, such as a wireless communication service provider network, a mobile service provider network, a machine type communication (MTC) network, and the like. In an embodiment, the service provider network 120 is a mobile service provider network that can be implemented using any suitable wireless communication technology, such as global system for mobile communication (GSM), universal mobile telecommunications system (UNITS), long-term evolution (LTE), and the like. In another embodiment, the service provider network 120 can be a MTC network, such as a narrowband Internet of Things (NB-IoT) network. The service provider network 120 includes a plurality of nodes, such as interface nodes 130, core nodes 140, and the like that are coupled together by any suitable network technology, such as wired, wireless, fiber optical network, and the like.

In an example, the interface nodes 130, such as base stations, Node Bs, evolved Node Bs, and the like, include hardware components and software components configured to enable wireless communications between the interface nodes 130 and electronic devices, such as the electronic device 110, and the like that has subscribed services provided by the service provider network 120. Further, in the example, the core nodes 140 include hardware components and software components to form a backbone to manage and control the services provided by the service provider network 120.

In an embodiment, a network carrier, a carrier frequency of the service provider network 120, such as a NB-IoT network, can be deployed as in-band within an existing LTE carrier, as guard-band within a guard-band of an LTE carrier, as stand-alone, for example, among GSM carriers, or the like. In an embodiment, the service provider network 120 can have multiple network carriers, such as anchor carriers and non-anchor carriers. The anchor carriers are located closer from a 100 kHz raster scan used by the electronic device 110 for example in the pre-sync mode than the non-anchor carriers. In one example, the anchor carriers are located 2.5 kHz or 7.5 kHz from the 100 kHz raster scan, while the non-anchor carriers are further away.

The electronic device 110 can be any suitable electronic device that can communicate with the service provider network 120. In an example, the electronic device 110 is a terminal device used by an end-user for mobile telecommunication, such as a cell phone, a smart phone, a tablet computer, and the like. In another example, the electronic device 110 is a MTC device (user equipment), such as a wireless meter, a wireless sensor, a wireless actuator, and the like. In an example, the electronic device 110 can be a NB-IoT device capable of communicating with a NB-IoT network.

In an embodiment, modulated signals, such as synchronization (sync) signals 101, can be transmitted at a network carrier from the service provider network 120, and during a downlink received by the receiver 111 at a local carrier, a carrier frequency of a local oscillator in the receiver 111. A carrier frequency offset is the difference between the network carrier and the local carrier. In an example, when the network carrier and the local carrier are synchronized, i.e. are identical, the carrier frequency offset is zero, and baseband signals can be retrieved from the modulated signals without inter-carrier interference (ICI). When the network carrier and the local carrier are not synchronized, i.e. are different, the carrier frequency offset is not zero, and the ICI occurs when the baseband signals are retrieved from the modulated signals. As a result, the synchronization parameters can include at least the carrier frequency offset.

In an embodiment, the synchronization parameters can also include timing, i.e. a time difference between an arrival of the sync signals 101 at the receiver 111 and a starting time of a processing window used by the electronic device 110 to select the sync signals 101. In another embodiment, the synchronization parameters can further include a cell identity, for example, the identity of the interface node 130 with which the electronic device 110 communicates.

In an embodiment, the sync signals 101 can include one or more frames, and each frame includes ten sub-frames (SF), SF0-SF9. Durations of a sub-frame and a frame can be 1 and 10 ms, respectively. Further, each sub-frame can include 14 time-multiplexed symbols. In an example, the sync signals 101, transmitted at an anchor carrier of a NB-IoT network, include a narrowband primary synchronization signal (NPSS) and a narrowband secondary synchronization signal (NSSS). The NPSS occupies SF5 of each frame while the NSSS occupies SF9 of even-numbered frames. Therefore, the NPSS and the NSSS appear in every 10 and 20 ms of the sync signals 101, respectively. In an example, the NPSS can be used to determine the carrier frequency offset and timing, where the timing can be the time difference of an arrival of a sub-frame or a symbol of the NPSS and a starting time of a fast Fourier transform (FFT) window of the electronic device 110. The NSSS can be used to determine the cell identity.

In another example, the sync signals 101, transmitted at a non-anchor carrier of a NB-IoT network, include a narrowband reference signal (NRS). The NRS can appear in downlink sub-frames, such as the sub-frames carrying narrowband physical broadcast channel (NPBCH), narrowband physical downlink control channel (NPDCCH), and narrowband physical downlink shared channel (NPDSCH). In an example, the NRS can be used to determine the carrier frequency offset and timing.

In an embodiment, the electronic device 110 is configured to periodically be in a low power mode for a period of time ranging, for example, from a few seconds to several days, followed by being in a working mode for a brief period of time, such as the time required to exchange a few hundred bytes with the service provider network 120. Further, the electronic device 110 can be a low cost device having a low cost crystal oscillator prone to large frequency drift, for example, during an extended low power mode. In addition, the electronic device 110 can be solely powered by a battery and deployed in an environment difficult or dangerous to access. Therefore, it is important to reduce the energy consumption of the pre-sync mode in order to extend a lifetime of the battery, for example, beyond ten years.

The receiver 111 can receive signals, such as the sync signals 101 transmitted at a network carrier, from the service provider network 120 during the downlink. The sync signals 101 can be used by the processor 112 to implement the pre-sync mode. In an example, the receiver 111 can have a local carrier synchronized to an anchor carrier of a NB-IoT network during a downlink. In another example, the receiver 111 can have a plurality of local carriers, such as a first local carrier synchronized to an anchor carrier of a NB-IoT network and a second local carrier synchronized to a non-anchor carrier of the NB-IoT network during the downlink. The transmitter 119 can transmit signals to the service provider network 120 during an uplink.

The processor 112 can be configured to implement a sleep phase during a portion of the pre-sync mode. As a result, the pre-sync mode includes a first phase and the sleep phase following the first phase. The processor 112 can include a sync engine 114, a mode controller 115, a plurality of timers including a pre-sync timer 116, a sleep phase timer 117, and a low power timer 118, and other components not shown in FIG. 1. During the first phase, the sync engine 114 can be configured to determine a quality of the sync signals 101 by detecting one or more quality parameters including at least one of a signal to noise ratio (SNR) of the sync signals 101, variations of the carrier frequency offset and timing, mobility characteristics of the electronic device 110, and the like. The sync engine 114 can also be configured to compare the one or more quality parameters with a respective pre-sync termination criterion, and then to set a sleep phase duration $T_S$ based on at least the quality of the sync signals 101. In an embodiment, the pre-sync termination criterion can be a threshold of a quality parameter, such as a threshold of the SNR and the like. In another embodiment, the pre-sync termination criterion can be a combination of thresholds of a plurality of quality parameters, such as a first threshold of the SNR and a second threshold of the carrier frequency offset, and the like.

In addition, the sync engine 114 can be configured to determine a pre-sync duration $T_{PS}$, the duration of the pre-sync mode, for example, based on the sync signals 101 received during prior working states. The sync engine 114 can also be configured to determine the synchronization parameters.

The mode controller 115 can be configured to control the timers 116-118, and the operation modes of the electronic device 110 according to the timers 116-118. For example, the mode controller 115 can set a timer value of a timer, and start the timer; when the timer expires, the mode controller 115 adjusts operation mode accordingly.

The pre-sync timer 116, the sleep phase timer 117, and the low power timer 118 can be any device or technique that is configured to keep track of time. In an embodiment, the pre-sync timer 116, the sleep phase timer 117, and the low power timer 118 can be implemented in hardware, such as using circuits. In an example, a timer is implemented using a counter circuit. For example, when a value is set to the timer, the counter circuit is initiated with the value; when the timer is started, the counter circuit counts down according to a clock signal at a steady pace; and when the counter circuit reaches zero, the timer expires.

In the FIG. 1 example, the pre-sync timer 116 can be configured to track time for the pre-sync duration $T_{PS}$; the sleep phase timer 117 can be configured to track time for the sleep phase duration $T_S$; and the low power timer 118 can be configured to track time for a duration of the low power mode $T_{LP}$.

The memory 113 can include a pre-sync memory 151 configured to store the pre-sync termination criteria, as discussed above, as well as look-up-tables (LUTs). In an example, the LUTs can be used to set $T_{PS}$.

In an embodiment, the electronic device 110 can be a system-on chip (SOC) where all the components, such as the receiver 111, the processor 112, the memory 113, and the transmitter 119, are located on a single integrated circuit (IC) chip. Alternatively, the components in the electronic device 110 can be distributed across multiple ICs. In an embodiment, the sync engine 114 and the mode controller 115 can be implemented using hardware, software, firmware, or any combination of aforementioned methods. In an example, the software implementing the pre-sync mode having the sleep phase can be stored in the memory 113 and be executed by hardware located in the processor 112.

During operation, the electronic device 110 is configured to communicate with the service provider network 120 in the communication system 100. The electronic device 110 starts in a working mode. The sync engine 114 is configured to determine the pre-sync duration $T_{PS}$ for example based on the sync signals 101 of the working mode. The duration of the low power mode $T_{LP}$ is determined by the electronic device 110 and the service provider network 120.

The pre-sync timer 116 and the low power timer 118 are set according to $T_{PS}$ and $T_{LP}$, respectively, by the mode controller 115. The mode controller 115 is configured to switch the electronic device 110 to the low power mode, and start the low power timer 118.

When the low power timer 118 expires, the mode controller 115 is configured to switch the electronic device 110 to the first phase of the pre-sync mode, and to start the pre-sync timer 116. The sync engine 114 can be configured to determine the quality of the sync signals 101 and the synchronization parameters. The sync engine 114 can also be configured to compare the one or more quality parameters with the respective pre-sync termination criterion stored in the memory space 151, and then to set the duration of the sleep phase $T_S$. The mode controller 115 is configured to set the sleep phase timer 117 according to $T_s$.

Subsequently, the mode controller 115 can be configured to terminate the first phase and start the sleep phase timer 117 to switch the electronic device 110 into the sleep phase. When the sleep phase timer 117 expires, the mode controller 115 can be configured to start a second phase of the pre-sync mode where the sync engine 114 is configured to determine the synchronization parameters until the pre-sync timer 116 expires.

When the pre-sync timer 116 expires, the mode controller 115 is configured to switch the electronic device 110 to a next working mode.

In an embodiment, the synchronization parameters, such as the carrier frequency offset and the timing can further be adjusted to be within acceptable ranges during the pre-sync mode, such as ±100 Hz for the carrier frequency offset and ±0.25/f for the timing, where f is a sampling frequency used by the electronic device 110.

In an example, the mode controller 115 is configured to turn off the receiver 111, the sync engine 114, the other components in the processor 112, and the transmitter 119 during the sleep phase and the low power mode. The mode controller 115 is configured to turn on the receiver 111, the sync engine 114, the other components in the processor 112, and the transmitter 119 when the electronic device 110 wakes up into each working mode, and the first and second phases of the pre-sync mode. The mode controller 115 can remain on during the low power mode and the sleep phase.

Figure 2:
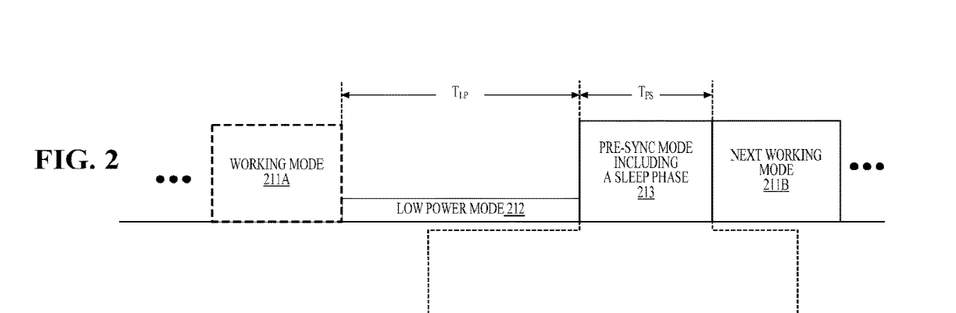
FIG. 2 shows an exemplary cycle of an operation mode transition from a low power mode to a next working mode via a pre-sync mode including a sleep phase according to an embodiment of the disclosure.

FIG. 2 shows an exemplary cycle of an operation mode transition from a low power mode 212 to a next working mode 211B via a pre-sync mode 213 including a sleep phase according to an embodiment of the disclosure. In an example, the electronic device 110 can be configured to implement the cycle of the operation mode transition. Taken the electronic device 110 being a NB-IoT device as an example. After a duration for NB-PDCCH monitoring (NB-PDCCH reception) in the working mode 211A, the electronic device 110 enter a low power mode (sleep mode) 212 to save power. After a duration of $T_{LP}$, the electronic device 110 is waken up to a pre-sync mode before the next working mode 211B. During the pre-sync duration $T_{PS}$, the electronic device 110 is waken up from low power mode to estimate the timing and frequency offset and correct them. Please be noted that this example is just for illustration purpose, and the invention is not limited thereto.

In an embodiment, a pre-sync duration $T_{PS}$ can be determined by the sync engine 114 based on the sync signals 101 received in prior working modes and/or pre-sync modes. In an example, $T_{PS}$ increases when the SNR decreases. In an example, when the duration of the low power mode 212 $T_{LP}$ increases, the carrier frequency offset can increase, thus making the pre-sync mode more time consuming and increasing $T_{PS}$. For example, $T_{PS}$ of the pre-sync mode 213 can be determined based on $T_{LP}$, as well as the SNR of the sync signals 101 received prior to the low power mode 212, such as in a prior working mode 211A.

For example, simulations using conditions worse than typical applications can be used to provide a range of $T_{PS}$ based on the SNR. For example, when the SNR is larger than 10 decibel (dB), $T_{PS}$ can be set between 20 and 30 milliseconds (ms); when the SNR is between 0 and 10 dB, $T_{PS}$ can be set between 60 and 120 ms; when the SNR is between −10 and 0 dB, $T_{PS}$ can be set between 200 and 570 ms; when the SNR is less than −10 dB, $T_{PS}$ can be set between 340 and 1660 ms. Further, $T_{PS}$ can be set according to $T_{LP}$. For example, $T_{PS}$ can be set to 200 ms when the SNR is between −10 and 0 dB and $T_{LP}$ is very short. In an example, a LUT with the above information can be stored in the pre-sync memory 151 to set $T_{PS}$.

When the electronic device 110 is configured to be in the working modes 211, the receiver 111, the processor 112, and the transmitter 119, are actively in operation, thus the electronic devices 110 consumes a relatively large amount of power. For example, when the electronic device 110 is configured in the working modes 211, the electronic device 110 can transmit signals to and receive signals from the service provider network 120, can process the signals, can perform operations, such as paging reception operation, neighbor cell measurement, random access operation, and the like. Note that the power consumption in the working modes 211 can vary depending on the specific operations. For example, transmitting signals can consume more power than paging reception.

When the electronic device 110 is configured in the low power mode 212, the receiver 111, the sync engine 114, the other components of the processor 112, and the transmitter 119, can be powered off to reduce power consumption, thus the electronic devices 110 consumes a relatively small amount of power. Note that the mode controller 115 can remain active in operation. In an example, the low power mode can include a power saving mode, an off-period of a discontinuous reception (DRX) or an extended DRX (eDRX), and the like. In an example, the duration of the low power mode 212 can vary from a few seconds of an off-period of the DRX to several days for the power saving mode. Note that the power consumption in the low power mode 212 can also vary depending on the specific operations. For example, the power saving mode can consume less power than that of the off-period of the DRX.

The electronic device 110 is configured to implement a pre-sync mode 213 when switching from the low power mode 212 to the next working mode 211B. In an example, the SNR of the sync signals 101 during the pre-sync 213 can be better than that during the working mode 211A when $T_{PS}$ is determined. According to the disclosure, the pre-sync mode 213 can include the sleep phase to save power. In an embodiment, the pre-sync mode 213 can include three phases where the sleep phase is sandwiched between the first and second phase. Further, in the first and second phase, the receiver 111 and the processor 112, are actively in operation, thus the electronic devices 110 consumes a relatively large amount of power. On the other hand, in the sleep phase, the receiver 111, the sync engine 114, the other components of the processor 112, and the transmitter 119, are powered off in an example to reduce power consumption. As a result, the power consumption of the sleep phase is less than that of the first and second phases.

In the first phase, the sync engine 114 can be configured to determine the quality of the sync signals 101 by detecting one or more quality parameters. The sync engine 114 can also be configured to compare the one or more quality parameters with a respective pre-sync termination criterion stored in the pre-sync memory 151, and then to set the sleep phase duration $T_S$ based on at least the quality of the sync signals 101. In both the first and second phase, the sync engine 114 can be configured to determine the synchronization parameters.

Figure 3:
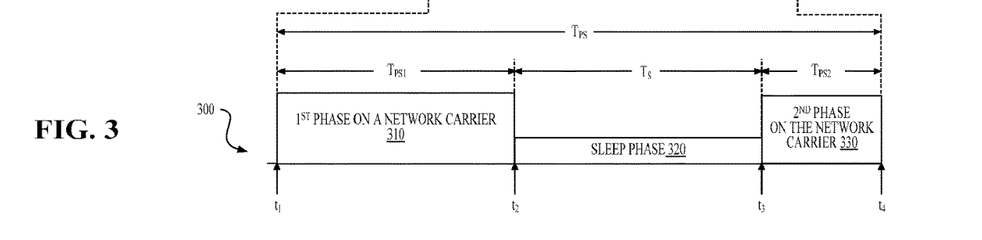
FIG. 3 shows an example of a pre-sync mode, where the pre-sync mode can be implemented based on sync signals transmitted at a network carrier according to an embodiment of the disclosure.

FIG. 3 shows an example of a pre-sync mode 300, where the pre-sync mode 300 can be implemented based on sync signals 101 transmitted at a network carrier according to an embodiment of the disclosure. In an example, the electronic device 110 in FIG. 1 can be configured to implement the pre-sync mode 300. In an example, the network carrier used to transmit the sync signals 101 can be an anchor carrier for a downlink of a NB-IoT network.

According to the disclosure, the pre-sync mode 300 can include three phases: a sleep phase 320 sandwiched between a first phase 310 on the network carrier and a second phase 330 on the same network carrier, as shown in FIG. 3. The durations of the first phase 310, the sleep phase 320, and the second phase 330 are $T_{PS1}$, $T_S$, and $T_{PS2}$, respectively. In an embodiment, the summation of $T_{PS1}$, $T_S$, and $T_{PS2}$ is equal to $T_{PS}$.

Prior to time $t_1$, $T_{PS}$ can be determined by the sync engine 114, as discussed above. The pre-sync timer 116 can be set according to $T_{PS}$. At time $t_1$, the mode controller 115 is configured to start the pre-sync timer 116, and switch the electronic device 110 to the first phase 310 on the network carrier.

During the first phase 310, the sync signals 101 are transmitted at the network carrier and are received by the receiver 111 at a local carrier. The sync engine 114 can be configured to determine the quality of the sync signals 101 including one or more quality parameters. In an embodiment, the one or more quality parameters can include the SNR of the sync signals 101, the variations of the carrier frequency offset and the timing, the mobility characteristics of the electronic device 110, and the like. In an example, the variations of the carrier frequency offset and timing can be standard deviations of the carrier frequency offset and timing, respectively. In an example, the mobility characteristics of the electronic device 110 can include a relative velocity of the electronic device 110 with respect to the service provider network 120, such as a stationary interface node 130 with which the electronic device 110 communicates. In an example, the carrier frequency offset and timing can be obtained repeatedly over an extended period of time in order to determine the respective variations.

The sync engine 114 can further be configured to compare the one or more quality parameters with the respective pre-sync termination criterion stored in the pre-sync memory 151, and set a sleep phase duration of a sleep phase 320 when the quality of the sync signals 101 exceeds the pre-sync termination criterion. In an embodiment, the pre-sync termination criterion can be a threshold of a quality parameter, such as a threshold of the SNR, a threshold of the variation of carrier frequency offset, and the like. In an example, the pre-sync termination criterion is the threshold of the SNR, thus, when the SNR of the sync signals 101 is greater than the threshold of the SNR, the sync engine 114 can proceed to set the sleep phase duration $T_S$. In another embodiment, the pre-sync termination criterion can be a combination of thresholds of a plurality of quality parameter, such as a first threshold of the SNR and a second threshold of a variation of a carrier frequency offset, and the like. In another example, the pre-sync termination criterion can be a combination of the first threshold of the SNR and the second threshold of the variation of the carrier frequency offset. When the SNR of the sync signals 101 is greater than the first threshold of the SNR and the variation of the carrier frequency offset is less than the second threshold of the variation of the carrier frequency offset, the sync engine 114 can proceed to set the sleep phase duration $T_S$. The pre-sync termination criteria can be stored in the pre-sync memory in LUTs of a combination of thresholds of the plurality of quality parameters.

In an embodiment, the second phase duration $T_{PS2}$ can be determined in order to set the sleep phase duration $T_S$. $T_{PS2}$ can be determined using similar methods configured to determine $T_{PS}$, as discussed above. In an example, $T_{PS}$ can be used to approximate an unknown sleep phase duration $T_S$. As a result, $T_{PS2}$ can be determined based on the SNR of the sync signals 101 in the first phase 310 and assuming the sleep phase duration as $T_{PS}$. In an example, $T_{PS2}$ can be set to zero under certain conditions, such as a combination of a large SNR, minimal variations of the carrier frequency offset and timing, a short $T_{PS}$, and the like. A LUT having $T_{PS2}$ and the respective quality parameters can also be stored in the pre-sync memory 151.

Subsequently, a current time $t_2$ can be used to determine the first phase duration as $T_{PS1}=t_2-t_1$. The sleep phase duration can then be determined using $T_S=T_{PS}-T_{PS1}-T_{PS2}$. The mode controller 115 is configured to set the sleep phase timer 117 according to $T_S$. Meanwhile at time $t_2$, the mode controller 115 can be configured to start the sleep phase timer 117 and switch the electronic device 110 into the sleep phase 320 when $T_S$ is greater than a sleep threshold. The sleep threshold can be set based on a minimal time slot used to transmit and receive the sync signals, such as 1 and 10 ms, corresponding to the durations of a sub-frame, a frame. The sleep threshold can also be set to 0 ms.

At time $t_3$, the sleep phase timer 117 expires, and the mode controller 115 can be configured to start the second phase 330 on the same network carrier if the second phase duration is larger than 0 ms. The sync signals 101 can be received by the same local carrier used in the first phase. In an embodiment, the sync engine 114 can be configured to determine the synchronization parameters.

At time $t_4$, the pre-sync timer 116 expires, and the mode controller 115 can be configured to switch the electronic device 110 to a next working mode.

In an embodiment, the sleep phase and the second phase may be omitted if the one or more quality parameters do not meet the respective pre-sync termination criterion. In such a case, the sleep phase duration and the second phase duration can be set to zero.

In an embodiment, the sleep phase and the second phase may be omitted if $T_{PS2}$ determined by the sync engine 140 can be longer than the difference of times $t_4$ and $t_2$. In such a case, the sleep phase duration and the second phase duration can be set to zero.

In an embodiment, the synchronization parameters can further be adjusted to be within acceptable ranges during the pre-sync mode 300, thus, the pre-sync mode 300 can be used to synchronize the local carrier to the network carrier, such as an anchor carrier of a NB-IoT network.

As discussed above, the receiver 111 can have multiple local carriers, for example, synchronized to an anchor carrier and a non-anchor carrier of an NB-IoT network, respectively. In an example, to implement the pre-sync mode on a non-anchor carrier in a NB-IoT network, ten valid sub-frames each having NRS are used, thus, under certain conditions, there is not enough time to determine the synchronization parameters. On the other hand, the multiple local carriers can be frequency-locked, i.e. the difference between two local carriers can remain a constant. As a result, in an embodiment, the pre-sync mode based on the non-anchor carrier can be implemented using two local carriers corresponding to two network carriers, such as a first network carrier for example an anchor carrier during a first phase and a second network carrier for example non-anchor carrier during a second phase, as shown in FIG. 4.

Figure 4:
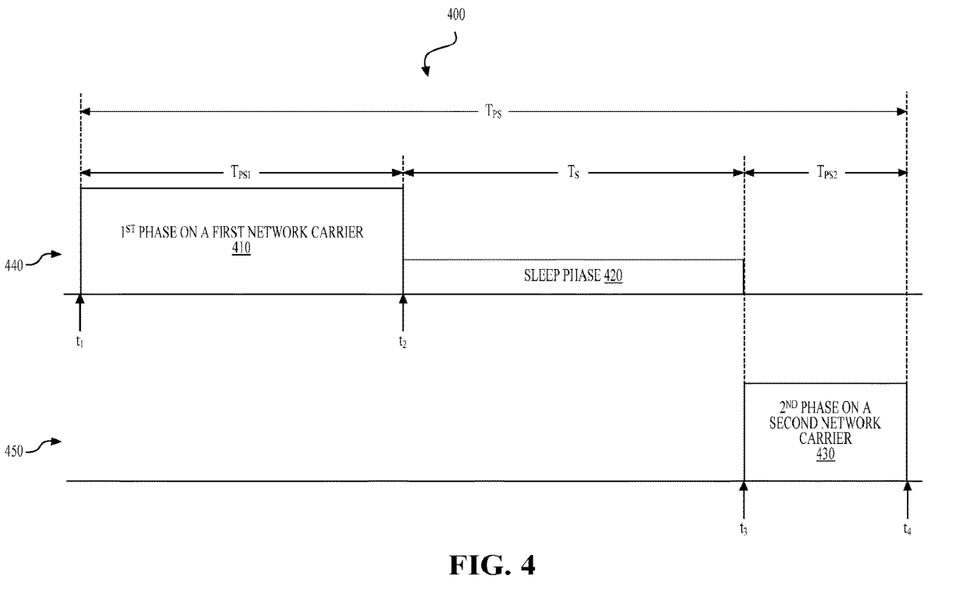
FIG. 4 shows an example of a pre-sync mode, where the pre-sync mode can be implemented based on sync signals transmitted at two different network carriers according to an embodiment of the disclosure.

FIG. 4 shows an example of a pre-sync mode 400, where the pre-sync mode 400 can be implemented based on sync signals 101 transmitted at two different network carriers according to an embodiment of the disclosure. In an example, the electronic device 110 in FIG. 1 can be configured to implement the pre-sync mode 400. According to the disclosure, the pre-sync mode 400 can include three phases: a sleep phase 420 sandwiched between a first phase 410 and a second phase 430, where the first phase 410 is implemented on a first network carrier, such as an anchor carrier, and the second phase 430 is implemented on a second network carrier, such as a non-anchor carrier. The durations of the first phase 410, the sleep phase 420, and the second phase 430 are $T_{PS1}$, $T_S$, and $T_{PS2}$, respectively. In an embodiment, the summation of $T_{PS1}$, $T_S$, and $T_{PS2}$ is equal to $T_{PS}$.

The description of the pre-sync mode 400 identical to that of the pre-sync mode 300 will be omitted here for clarity purposes because the pre-sync mode 400 operates similarly to the pre-sync mode 300. The differences between the pre-sync mode 400 and the pre-sync mode 300 are described below.

In the pre-sync mode 400, the receiver 111 can have two local carriers, a first local carrier 440 and a second local carrier 450. The first phase 410 can be implemented between the first local carrier 440 and the first network carrier, such as an anchor carrier, and the second phase 430 can be implemented between the second local carrier 450 and the second network carrier, such as a non-anchor carrier. As a result, a first carrier frequency offset in the first phase 410 is between the first local carrier 440 and the first network carrier. A second carrier frequency offset in the second phase 430 is between the second local carrier 450 and the second network carrier.

In an embodiment, the sync signals 101 used in the first phase 410 and the second phase 430 can be different. In an example, the NPSS and the NSSS can be used as the sync signals 101 in the first phase 410, where the first network carrier can be the anchor carrier for the downlink of the NB-IoT network. The NRS can be used as the sync signals 101 in the second phase 430, where the second network carrier can be the non-anchor carrier for the downlink of the NB-IoT network. As a result, a second phase duration $T_{PS2}$ can be determined using a different method. In an example, ten valid sub-frames each having the NRS can be used in the second phase 430 to determine the synchronization parameters. Therefore, $T_{PS2}$ can be obtained by the sync engine 140 from the duration of the ten valid sub-frames each having the NRS.

Figure 5:
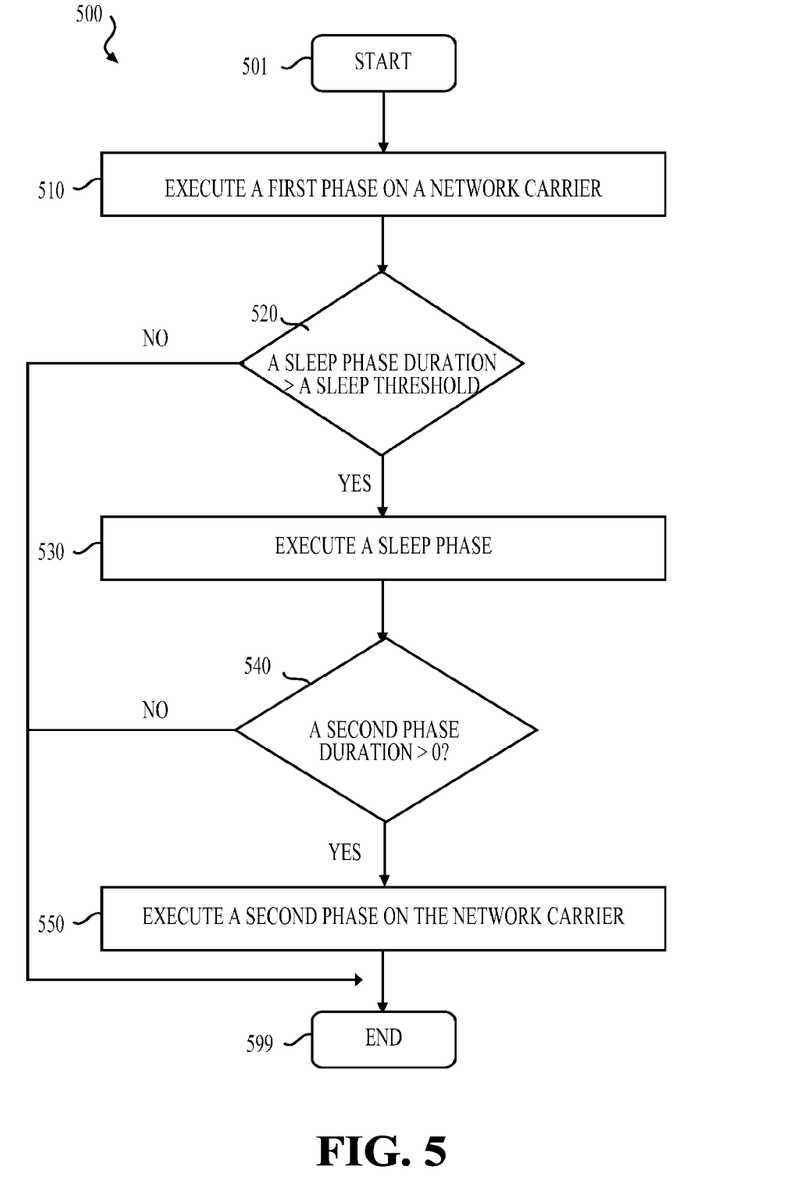
FIG. 5 shows a flow chart outlining an exemplary process according to an embodiment of the disclosure.

FIG. 5 shows a flow chart outlining an exemplary process 500 according to an embodiment of the disclosure. In an example, the process 500 can be executed by the electronic device 110 in FIG. 1 to implement a pre-sync mode 300.

Prior to S501, a pre-sync duration $T_{PS}$ can be determined or received. For example, the sync engine 114 can be configured to determine $T_{PS}$ based on signals received from prior working modes and/or pre-sync modes, as discussed above.

The process starts at S501, the pre-sync timer 116 can be set according to $T_{PS}$ by the mode controller 115. The process then proceeds to S510.

At S510, a first phase of the pre-sync mode is executed. In an example, the electronic device 110 is configured to execute the first phase on a first network carrier, at which the sync signals 101 can be transmitted. In an embodiment, the mode controller 115 can be configured to start the pre-sync timer 116. The synchronization parameters including the carrier frequency offset can be determined based on the sync signals 101, such as NPSS and NSSS at an anchor carrier in a NB-IoT network. Further, the synchronization parameters can be adjusted to be within acceptable ranges. In addition, a quality of the sync signals 101 can be detected by detecting one or more quality parameters based on the sync signals 101, such as the SNR, the variation of the carrier frequency offset, and the like.

The one or more quality parameters can be compared with a respective pre-sync termination criterion. In an embodiment, the pre-sync termination criterion can be a threshold of a quality parameter, such as a threshold of the SNR and the like. In another embodiment, the pre-sync termination criterion can be a combination of thresholds of a plurality of quality parameter, such as a first threshold of the SNR and a second threshold of the carrier frequency offset, and the like. As discussed above, when the one or more quality parameters meet the pre-sync termination criterion, a sleep phase duration $T_S$ and second phase duration $T_{PS2}$ can be determined based on at least the quality of the sync signals 101, respectively, as discussed above. The process then proceeds to S520.

When the one or more quality parameters do not meet the pre-sync termination criterion, the first phase is executed repeatedly until the pre-sync timer 116 expires or until the one or more quality parameters meet the pre-sync termination criterion. When the pre-sync timer 116 expires, the process proceeds to S599, and terminates.

At S520, the sleep phase duration $T_S$ is compared with a sleep threshold, set based on a minimal time slot used to transmit and receive the sync signals, such as 1 and 10 ms, corresponding to the durations of a sub-frame, a frame, and the like. The sleep threshold can also be set to 0 ms. When $T_S$ exceeds the sleep threshold, the process then proceeds to S530. Otherwise, the process proceeds to S599, and terminates.

At S530, the sleep phase is executed. In an example, the mode controller 115 can be configured to start the sleep phase timer 117, and switch the electronic device 110 to the sleep phase. During the sleep phase, the receiver 111, the sync engine 114, the transmitter 119, and other components of the processor 112 can, for example, be turned off to save power. Therefore, the sync signals cannot be received or processed. When the sleep phase timer 117 expires, the process then proceeds to S540.

At S540, the second phase duration $T_{PS2}$ is compared with zero. When $T_{PS2}$ is larger than zero, the process then proceeds to S550. Otherwise, the process then proceeds to S599, and terminates.

At S550, a second phase of the pre-sync mode can be executed. In an example, the electronic device 110 is configured to execute the second phase on the first network carrier used in the first phase. The synchronization parameters can be determined based on the sync signals 101, such as NPSS and NSSS of the downlink anchor carrier in the NB-IoT network. Further, the synchronization parameters can be adjusted to be within acceptable ranges, such as ±100 Hz for the carrier frequency offset. When the pre-sync timer 116 expires, the process then proceeds to S599, and terminates.

Figure 6:
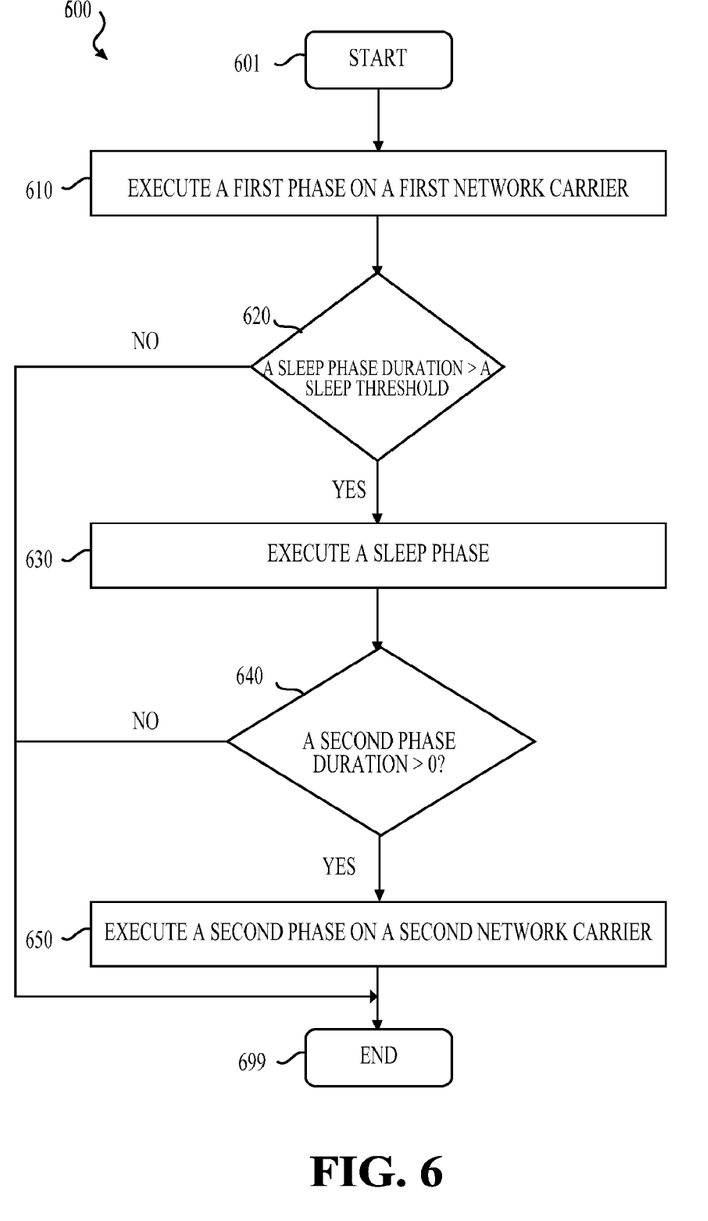
FIG. 6 shows a flow chart outlining an exemplary process according to an embodiment of the disclosure.

FIG. 6 shows a flow chart outlining an exemplary process 600 according to an embodiment of the disclosure. In an example, the process 600 can be executed by the electronic device 110 in FIG. 1 to implement a pre-sync mode 400. The description of the process 600 identical to that of the process 500 will be omitted here for clarity purposes because the process 600 operates similarly to the process 500. The differences between the process 600 and the process 500 are described below.

As discussed above, the pre-sync mode 400 can be implemented using two different network carriers in the process 600. As a result, the sync signals 101 can be different during the first phase and the second phase. In an example, the sync signals 101 can be NPSS and NSSS at a first network carrier in S610, and can be NRS at a second network carrier in S650. Further, the second phase duration $T_{PS2}$ can be determined differently in S610 by using, for example, a duration of ten valid sub-frames each having the NRS. In addition, S650 is implemented differently by using, for example, NRS as the sync signals to determine the synchronization parameters.

In various examples, the processor 112 or functions of the processor 112 can be implemented with hardware, firmware, software, or combination thereof. In one example, the processor 112 is implemented in hardware, such as a processing circuit, the hardware may comprise one or more of discrete components, an integrated circuit, an application-specific integrated circuit (ASIC), and the like. In another example, functions of the processor 112 can be implemented with software or firmware including instructions stored in a computer-readable non-volatile storage medium, such as the memory 113. The instructions, when executed by a processing circuit, causing the processing circuit to perform the respective functions.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method of waking an electronic device that communicates with a network from a low power mode to a working mode, comprising:
    transitioning from the low power mode to a pre-sync mode the p-sync mode including a first phase having a first phase duration and a sleep phase having a sleep phase duration;
    detecting a quality of synchronization signals transmitted on a first network carrier of the network during the first phase of the pre-sync mode;
    setting the sleep phase duration of the sleep phase based on at least the detected quality of the synchronization signals; and
    transitioning during the pre-sync mode from the first phase to the sleep phase when the sleep phase duration is greater than a sleep threshold,
    wherein detecting the quality of the synchronization signals during the first phase of the pre-sync mode includes detecting one or more quality parameters during the first phase that include at least one of a signal to noise ratio (SNR) of the synchronization signals a variation of a carrier frequency offset between a local carrier of the electronic device and the first network carrier, a variation of timing between an arrival of the synchronization signals and a starting time of a processing window of the electronic device, and mobility characteristics of the electronic device.

2. The method of claim 1, wherein the sleep phase duration of the sleep phase is set based on a pre-sync duration of the pre-sync mode, the first phase duration, and a second phase duration of a second phase of the pre-sync mode, wherein the second phase duration of the second phase is determined based on at least the one or more quality parameters.

3. The method of claim 2, further comprising:
    transitioning from the sleep phase to the second phase when the sleep phase is complete and the second phase duration is larger than zero, wherein the synchronization signals are transmitted on a second network carrier in the second phase of the pre-sync mode.

4. The method of claim 3, wherein the first and second network carriers are an identical anchor carrier of a narrowband Internet of Things (NB-IoT) network.

5. The method of claim 3, wherein the first network carrier is an anchor carrier of a narrowband Internet of Things (NB-IoT) network and the second network carrier is a non-anchor carrier of the NB-IoT network.

6. The method of claim 3, wherein the sleep phase consumes less power than either the first phase or the second phase of the pre-sync mode.

7. The method of claim 1, wherein the sleep threshold is set based on a minimal time slot used to transmit and receive the synchronization signals.

8. An electronic device for waking from a low power mode to a working mode, comprising:
    a receiver configured to receive synchronization signals from a network; and
    a processor including:
        a mode controller configured to switch the electronic device from the low power mode to a pre-sync mode, the pre-sync mode including a first phase having a first phase duration and a sleep phase having a sleep phase duration, and switch the electronic device during the pre sync mode from the first phase to the sleep phase when the sleep phase duration is greater than a sleep threshold; and
        a sync engine configured to detect a quality of the synchronization signals transmitted on a first network carrier of the network during the first phase of the pre-sync mode, and set the sleep phase duration of the sleep phase based on at least the detected quality of the synchronization signals,
    wherein the sync engine is configured to detect the quality of the synchronization signals during the first phase of the pre-sync mode by detecting one or more quality parameters during the first phase that include at least one of a signal to noise ratio (SNR) of the synchronization signals, a variation of a carrier frequency offset between a local carrier of the electronic device and the first network carrier, a variation of timing between an arrival of the synchronization signals and a starting time of a processing window of the electronic device, and mobility characteristics of the electronic device.

9. The electronic device of claim 8, wherein the sync engine is configured to set the sleep phase duration based on a pre-sync duration of the pre-sync mode, the first phase duration, and a second phase duration of a second phase of the pre-sync mode, wherein the second phase duration of the second phase is determined based on the one or more quality parameters.

10. The electronic device of claim 9, wherein the mode controller is further configured to switch the electronic device from the sleep phase to the second phase when the sleep phase is complete and the second phase duration is larger than zero, wherein the synchronization signals are transmitted on a second network carrier in the second phase of the pre-sync mode.

11. The electronic device of claim 10, wherein the receiver is configured to receive the synchronization signals transmitted at the first and second network carriers that are an identical anchor carrier of a narrowband Internet of Things (NB-IoY) network.

12. The electronic device of claim 10, wherein the receiver is configured to receive the synchronization signals transmitted at the first network carrier that is an anchor carrier of a narrowband Internet of Things (NB-IoT) network, and the receiver is configured to receive the synchronization signals transmitted at the second network carrier that is a non-anchor carrier of the NB-IoT network.

13. The electronic device of claim 8, wherein the sync engine is configured to set the sleep threshold based on a minimal time slot used to transmit and receive the synchronization signals.

14. A non-transitory computer readable medium having computer readable instructions stored thereon which, when executed by a processing circuit, cause the processing circuit to perform a method of waking an electronic device that communicates with a network from a low power mode to a working mode, the method comprising:

transitioning from the low power mode to a pre-sync mode, the pre-sync mode including a first phase having a first phase duration and a sleep phase having, a sleep phase duration;

detecting a quality of synchronization signals transmitted on a first network carrier of the network during the first phase of the pre-sync mode:

setting the sleep phase duration of the sleep phase based on at least the detected quality of the synchronization signals; and transitioning during the pre-sync mode from the first phase to the sleep phase when the sleep phase duration is greater than a sleep threshold, wherein the method further comprises:

detecting the quality of the synchronization signals during the first phase of the pre-sync mode by detecting one or more quality parameters during the first phase that include at least one of a signal to noise ratio (SNR) of the synchronization signals, a variation of a carrier frequency offset between a local carrier of the electronic device and the first network carrier, a variation of timing between an arrival of the synchronization signals and a starting time of a processing, window of the electronic device, and mobility characteristics of the electronic device.

15. The non-transitory computer readable medium of claim 14, wherein the method further comprises:

setting the sleep phase duration of the sleep phase based on a pre-sync duration of the pre-sync mode, the first phase duration, and a second phase duration of a second phase of the pre-sync mode, wherein the second phase duration of the second phase is determined based on at least the one or more quality parameters.

16. The non-transitory computer readable medium of claim 15, wherein the method further comprises:

transitioning from the sleep phase to the second phase when the sleep phase is complete and the second phase duration is larger than zero, wherein the synchronization signals are transmitted on a second network carrier in the second phase of the pre-sync mode.

17. The non-transitory computer readable medium of claim 16, wherein the method further comprises:

receiving the synchronization signals transmitted at an anchor carrier of a narrowband Internet of Things (NB-IoT) network in the first and second phase of the pie-sync mode.

* * * * *